(12) United States Patent
Burke et al.

(10) Patent No.: US 8,528,273 B2
(45) Date of Patent: Sep. 10, 2013

(54) WASHER

(76) Inventors: John Thomas Burke, New South Wales (AU); Allan Walsh, New South Wales (AU)

( * ) Notice: Subject to any disclaimer, the term of this patent is extended or adjusted under 35 U.S.C. 154(b) by 36 days.

(21) Appl. No.: 12/992,755

(22) PCT Filed: Jul. 14, 2009

(86) PCT No.: PCT/AU2009/000898
§ 371 (c)(1),
(2), (4) Date: Dec. 8, 2010

(87) PCT Pub. No.: WO2010/006363
PCT Pub. Date: Jan. 21, 2010

(65) Prior Publication Data
US 2011/0076110 A1     Mar. 31, 2011

(30) Foreign Application Priority Data

Jul. 15, 2008   (AU) .................... 2008903602

(51) Int. Cl.
*E04G 21/14*   (2006.01)

(52) U.S. Cl.
USPC ........................................ 52/125.5

(58) Field of Classification Search
USPC ............ 411/539, 149; 52/125.5, 79.9, 582.1, 52/583.1, 698; 249/190
See application file for complete search history.

(56) References Cited

U.S. PATENT DOCUMENTS

| | | | |
|---|---|---|---|
| 629,699 A | 7/1899 | McQueen | |
| 2,685,469 A | 8/1954 | Butler et al. | |
| 3,621,626 A * | 11/1971 | Tylius | 52/223.13 |
| 3,782,061 A * | 1/1974 | Minutoli et al. | 52/125.5 |
| 4,035,093 A * | 7/1977 | Redshaw | 403/4 |
| 5,485,704 A * | 1/1996 | Sandor, Sr. | 52/584.1 |
| 6,065,263 A * | 5/2000 | Taguchi | 52/583.1 |
| 6,203,231 B1 * | 3/2001 | Salice | 403/12 |
| 6,668,506 B2 * | 12/2003 | Snauwaert | 52/583.1 |
| 6,966,722 B1 * | 11/2005 | Borror et al. | 403/3 |
| 2002/0020131 A1* | 2/2002 | Hongyo et al. | 52/582.1 |
| 2008/0003079 A1* | 1/2008 | Martinson | 411/539 |

FOREIGN PATENT DOCUMENTS

| FR | 2744501 A | 8/1997 |
|---|---|---|
| FR | 2744501 A1 * | 8/1997 |

* cited by examiner

*Primary Examiner* — Brian Glessner
*Assistant Examiner* — Paola Agudelo
(74) *Attorney, Agent, or Firm* — Jansson Munger McKinley & Shape Ltd.

(57) ABSTRACT

A washer assembly for a threaded fastener said assembly including a first washer portion having an aperture through which the threaded fastener is to pass, and a surface surrounding said aperture; and a second washer portion, said second washer portion having an aperture through which the fastener is to pass, the second portion having a surface surrounding the aperture of the second portion and being positioned to abut the surface of the first portion and to be urged into contact therewith upon tensioning of the fastener; and wherein the surface of said second portion extends beyond the aperture of said first portion when the surfaces abut, the aperture of said first portion is dimensioned to provide for relative movement between the portions with the apertures aligned to provide for the insertion of the threaded fastener therethrough, and said surfaces have cooperating projections and recesses that inhibit relative movement between the portions when the threaded fastener is tensioned urging the surface of said second portion against the surface of said first portion.

18 Claims, 5 Drawing Sheets

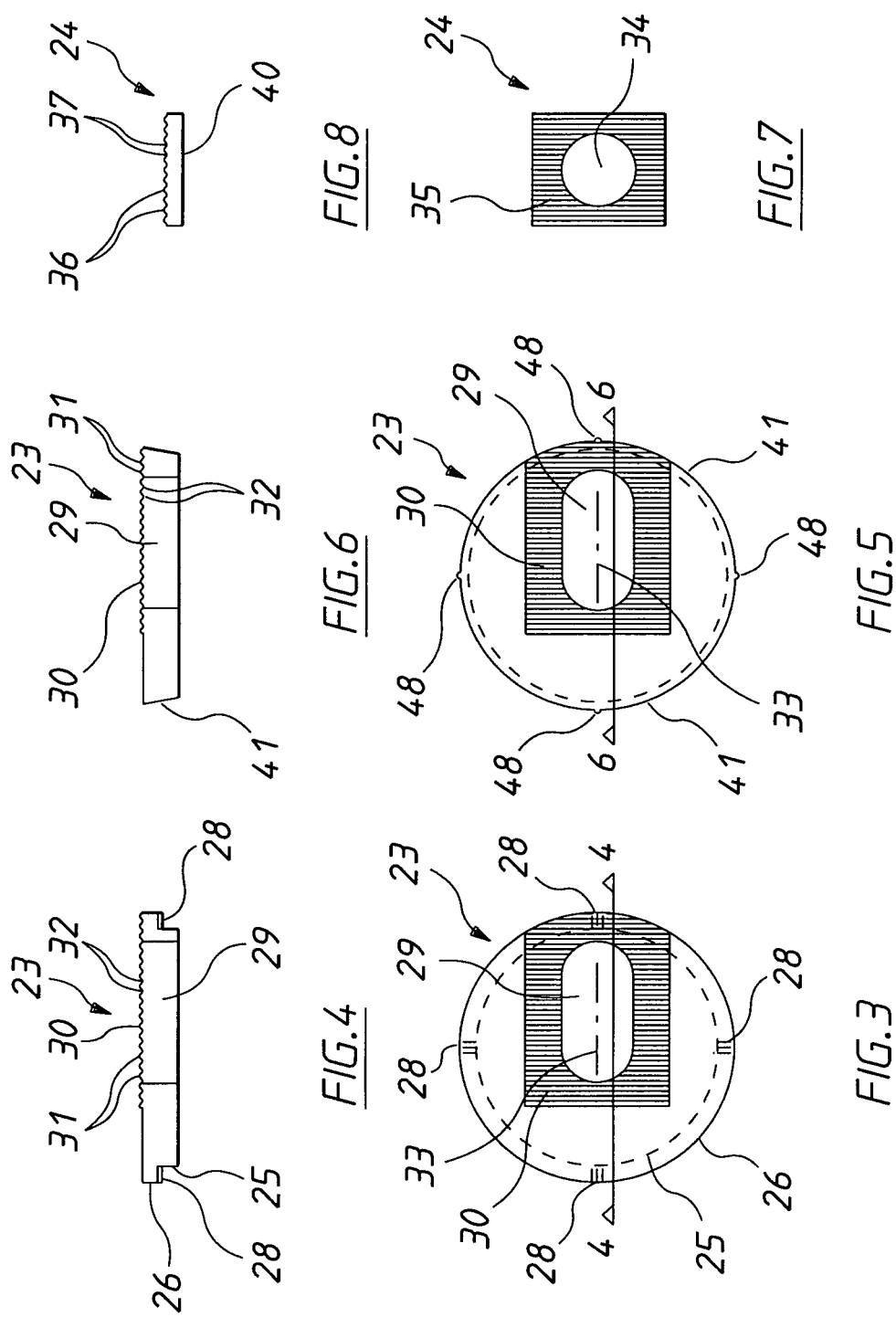

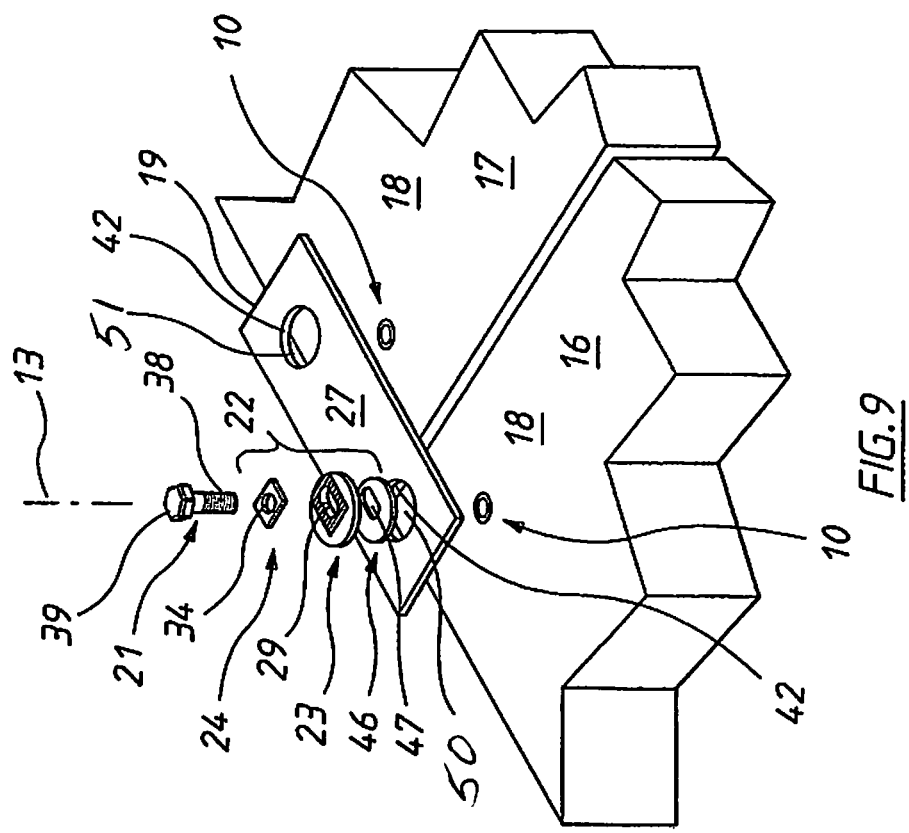

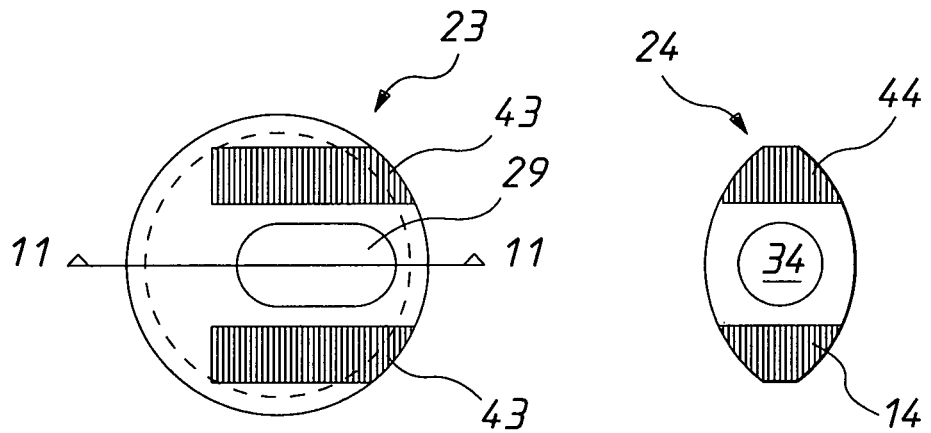
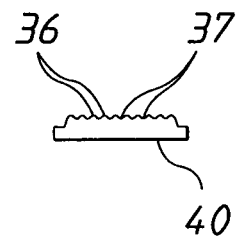
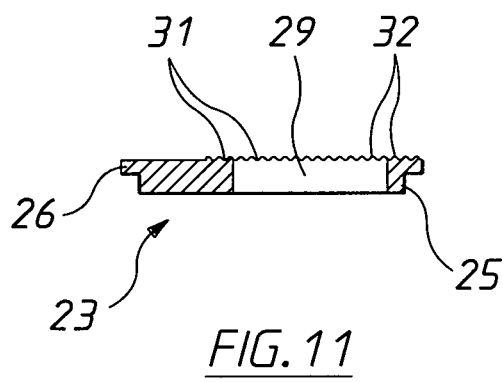
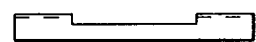
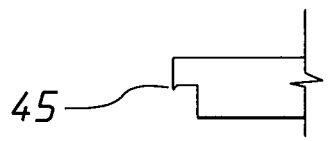

WASHER

TECHNICAL FIELD

The present invention relates to washers and more particularly to a washer assembly to accommodate varying dimensions in items to be secured together by means of a threaded fastener.

BACKGROUND OF THE INVENTION

In the use of pre-cast concrete elements it is not uncommon for the elements to be secured together by means of metal plates or straps. Typically the concrete elements to be secured together would each have embedded in them a ferrule. A metal plate extends between the ferrules with threaded fasteners then passing through the metal plate to engage within the ferrules to secure the case elements together.

Due to difficulties in accurately locating the ferrules and/or the position of the elements a disadvantage of the above discussed method is the difficulty of providing an appropriate sized metal plate.

OBJECT OF THE INVENTION

It is the object of the present invention to overcome or substantially overcome the above disadvantage.

SUMMARY OF THE INVENTION

There is disclosed herein a washer assembly for a threaded fastener said assembly including:

a first washer portion having an aperture through which the threaded fastener is to pass, and a surface surrounding said aperture; and a second washer portion, said second washer portion having an aperture through which the fastener is to pass, the second portion having a surface surrounding the aperture of the second portion and being positioned to abut the surface of the first portion and to be urged into contact therewith upon tensioning of the fastener; and wherein the surface of said second portion extends beyond the aperture of said first portion when the surfaces abut, the aperture of said first portion is dimensioned to provide for relative movement between the portions with the apertures aligned to provide for the insertion of the threaded fastener therethrough, and said surfaces have co-operating projections and recesses that inhibit relative movement between the portions when the threaded fastener is tensioned urging the surface of said second portion against the surface of said first portion.

Preferably, the aperture of said first portion has a longitudinal transverse axis with said aperture of said first portion being elongated in direction of said longitudinal axis.

Preferably, said projections are ridges and said recesses are slots.

Preferably, both surfaces have ridges and slots.

Preferably, said first portion includes projections to engage an article to be engaged by the threaded fastener.

Preferably, the assembly is adapted to secure a coupling plate to secure the coupling plate to an element, said coupling plate having an aperture to receive at least part of said first washer portion, and said coupling plate having a thickness, and wherein said assembly further includes a support plate located in the aperture of the first washer, the support plate having a thickness no greater than the thickness of the coupling plate, with said support plate having an aperture through which the threaded fastener is to pass.

Preferably, the aperture of said plate is the same configuration as the aperture of said second washer.

Preferably, the aperture of said first washer provides a cavity in said first washer, and said support plate substantially occupies said aperture.

Preferably, the projections and recesses of said surfaces surround the apertures of the first and second washer portion.

Preferably, each surface has the projections and ridges located in two areas, the areas being located on opposite sides of the respective aperture.

Preferably, the first washer portion is generally circular in configuration.

There is further disclosed herein, in combination a first concrete element and a second concrete element, each of the elements having a surface, with the concrete surfaces being adjacent, with at least one of the concrete elements having embedded in it a ferrule having a threaded passage extending inwardly of the element from the respective surface of that element, a coupling plate to be fixed to at least said one element, the above washer assembly securing the coupling plate to said one element, and a threaded fastener passing through the washer assembly and engaged in the ferrule to secure the coupling plate to the respective concrete element.

Preferably, said coupling plate has an aperture through which the threaded fastener passes, with the first washer portion urged into secure engagement with the coupling plate to secure the coupling plate to the concrete element.

BRIEF DESCRIPTION OF THE DRAWINGS

Preferred embodiments of the present invention will now be described, by way of an example, with reference to the accompanying drawings wherein:

FIG. 3 is a schematic top plan view of a modification of the washer of FIG. 5;

FIG. 4 is a schematic sectioned side elevation of the washer of FIG. 3 section along the lines 4-4;

FIG. 5 is a schematic top plan view of a first washer portion employed in the washer assembly of FIG. 1;

FIG. 6 is a schematic second side elevation of the washer portion of FIG. 5 section along the line 6-6;

FIG. 7 is a schematic top plan view of a second washer portion employed in the washer assembly of FIG. 1;

FIG. 8 is a schematic side elevation of the washer portion of FIG. 7;

FIG. 9 is a schematic parts exploded isometric view of a modification of the threaded fastener, ferrule and washer assembly of FIG. 1;

FIG. 10 is a schematic top plan view of a modification of the washer of FIG. 3;

FIG. 11 is a schematic sectioned side elevation of the washer of FIG. 10 sectioned along the line 11-11;

FIG. 12 is a schematic top plan view of a modification of the washer of FIG. 7;

FIG. 13 is a schematic end elevation of the washer of FIG. 12;

FIG. 14 is a schematic side elevation of the washer of FIG. 12; and

FIG. 15 is a schematic side elevation of a modification of the washer of FIG. 10.

DETAILED DESCRIPTION OF THE PREFERRED EMBODIMENTS

Figure 1:
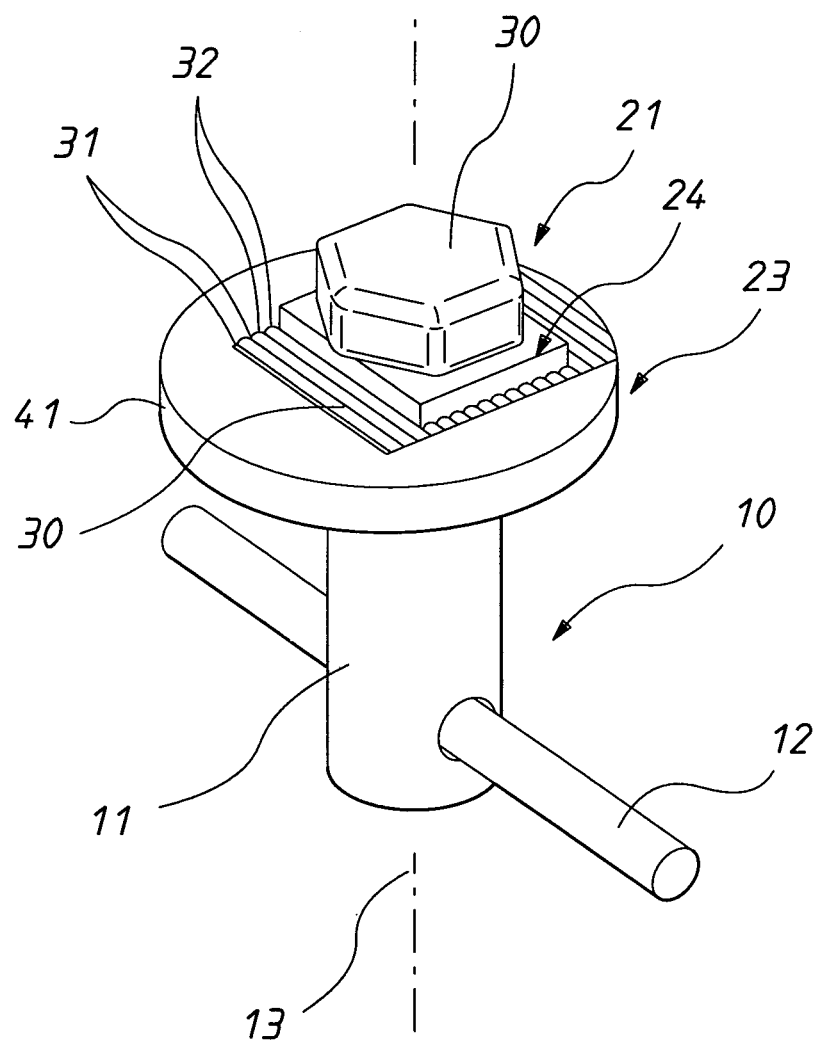
FIG. 1 is a schematic isometric view of a threaded fastener, ferrule and washer assembly.
Figure 2:
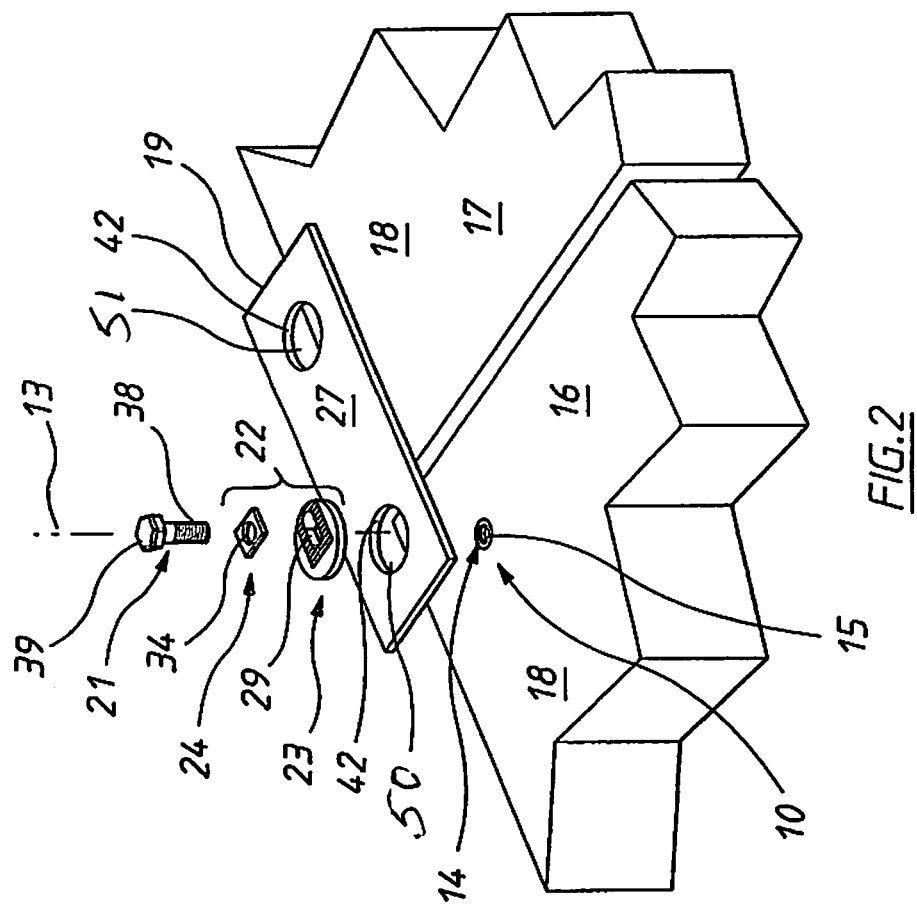
FIG. 2 is a schematic isometric parts exploded view of a pair of cast concrete elements to be secured together by a metal strap employing a ferrule, washer assembly and threaded fastener of FIG. 1.

In the accompanying drawings there is schematically depicted a ferrule 10 that is intended to be cast into a concrete element, such as a concrete panel or floor. The ferrule 10 includes a cylindrical body 11 through which there transversely extends a pin 12 to aid in retaining the ferrule 10 in a concrete element. The body 11 has a longitudinal axis 13 and is a cylindrical configuration. The body 11 has a longitudinal passage 14 that is threaded and terminates at its end with an annular end surface 15.

Typically, the ferrule 10 would be embedded in a concrete element 16. The element 16 is intended to be secured to an adjacent element 17 also having a ferrule 10 (not illustrated), with the elements 16 and 17 having generally planar surfaces 18 that are co-planar. However the surfaces 18 could also be perpendicular.

To secure the elements 16 and 17 together there is provided a metal coupling plate 19 that is in the form of a strip. The plate 19 has a pair of apertures 50 and 51. When the plate 19 is abutting the surfaces 18, the apertures 50 and 51 expose the passages 14 of the adjacent ferrules 10 so that threaded fasteners 21 may pass therethrough and engage in a threaded passages 14 of the associated ferrule 10.

A washer assembly 22 is used with each threaded fastener 21 so that upon tension of the threaded fastener 21 the washer assembly 22 engages the plate 19 and retains the plate 19 fixed to the elements 16 and 17.

The washer assembly 22 includes a first washer portion 23 and a second washer portion 24.

In the embodiment of FIGS. 3 and 4 the washer portion 23 is of a circular configuration and includes an annular part 25 that engages within the circular aperture 20/21 and preferably is a reasonably tight fit in respect thereof. Extending laterally beyond the part 25 is an annular flange 26 that abuts the top surface 27 of the plate 19 and includes ridges 28 that engage the surface 27 and preferably plastically deform the plate 19 so that the portion 23 is firmly secured thereto. The portion 23 has an aperture 29 through which the threaded fastener 21 passes. Surrounding the aperture 29 is a surface 30 that is provided with a plurality of projections and recesses. In this embodiment the projections and recesses are a plurality of generally parallel ridges 31 separated by generally parallel slots 32. The aperture 29 has a longitudinal axis 33 which the aperture 29 being longitudinally elongated in the direction of the axis 33.

The second washer portion 24 has an aperture 34 that is generally circular in configuration, with the aperture 34 being surrounded by a surface 35. The surface 35 has a plurality of projections and recesses. In this embodiment the projections and recesses of the portion 24 are generally parallel ridges 36 separated by parallel slots 37.

When assembled the plate 19 is placed on top of the surface 18 so that the passages 14 are exposed. Thereafter, in respect of each ferrule 10, the first washer portion 23 is inserted in the apertures 50/51 with the second washer portion 24 then being applied so that the surfaces 30 and 35 abut. Preferably they abut with the ridges 31 and 36 being generally parallel with the ridges 31 being located in the slots 37 and the ridges 36 being located in the slots 32. Thereafter the threaded fastener 21 is inserted through the aligned apertures 50/51, 34 and 29 so that the threaded shaft 38 threadingly engages within the threaded passage 14. Thereafter the head 39 of fastener 21 is rotated to tension the fastener 21. Tensioning of the fastener 21 occurs as the head 29 abuts the upper surface 40 of the portion 24. As the threaded fastener 21 is further tensioned, the washer portion 24 is urged into contact with the washer portion 23. In particular, the surfaces 30, 35 engage so that the washer portion 24 becomes fixed to the washer portion 23, with the washer portion 23 then urging the plate 19 against the surfaces 18, thus securing the plate 19 to the elements 16 and 17.

In the embodiment of FIGS. 5 and 6, the washer portion 23 has a tapered peripheral surface 41 that engages the surface 42 of the associated aperture 20/21 so that the portion 23 becomes "wedged" in the apertures 20/21.

As the aperture 29 is elongated in the direction of the axis 33, the washer portions 23, 24 can be moved angularly about the axis 13 thereby adjusting for any inaccuracies in locating the elements 16 and 17, and/or inaccuracies in location of the ferrules 10. That is, by moving the portions 23, 24 about the axis 13 the aperture 29 is moved angularly about the axis 13 thereby providing for adjustment in respect of position.

In FIG. 9 there is schematically depicted a modification of the washer assembly 22. In this embodiment there is provided a support plate 46 that is received within the aperture 50/51. The plate 46 has a thickness less than the thickness of the plate 19 so that when the first washer portion 23 projects into the aperture 20 and the threaded fastener 21 tensioned, the plate 46 aids in supporting the first washer portion 23.

The plate 46 has an aperture 47 that is essentially the same configuration as the aperture 29.

In the previous embodiments, the surface 30 having the projections and recesses surrounds the aperture 29 while the surface 35 also having the projections and recesses surrounds the apertures 34. In the embodiment of FIGS. 10 to 14, the surface 30 of the previous embodiments is divided into two surface areas 43 that are located on opposite sides of the aperture 29, while in the case of surface 35 it is divided into two areas 44 located on opposite sides of the aperture 34.

In a further still modification, the first washer portion 23 may have sharp edge projections 45 located at spaced angular positions about the axis 13 to aid in securing the first washer portion 23 to the plate 19.

Reference throughout this specification to "the embodiment," "the previous embodiment," "one embodiment," "an embodiment," "a preferred embodiment" or similar language means that a particular feature, structure, or characteristic described in connection with the embodiment is included in at least one embodiment of the present invention. Thus, appearances of the phrases "in the embodiment," "in the previous embodiment," "in one embodiment," "in an embodiment," "in a preferred embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

While the present invention has been described in connection with certain exemplary or specific embodiments, it is to be understood that the invention is not limited to the disclosed embodiments, but, on the contrary, is intended to cover various modifications, alternatives, modifications and equivalent arrangements as will be apparent to those skilled in the art.

Any such changes, modifications, alternatives, modifications, equivalents and the like may be made without departing from the spirit and scope of the invention.

The invention claimed is:

1. A combination comprising:
   a first washer portion having a first aperture through which a threaded fastener passes, a surface surrounding said aperture to engage a coupling plate; and
   a second washer portion, having a second aperture through which the fastener passes, the second washer portion having a surface surrounding the second aperture positioned to abut the surface of the first washer portion and to be urged into contact therewith upon tensioning of the fastener;
   a first concrete element;
   a ferrule embedded in the first concrete element and including a threaded passage extending inwardly of the first concrete element to be threadably engaged by the threaded fastener;
   a second concrete element adjacent the first concrete element;
   the coupling plate having a pair of spaced plate apertures to provide for the coupling of the first and second concrete elements; and
   the surface of said second washer portion extends beyond the first aperture when the surfaces abut, the first aperture is dimensioned to provide for relative movement between the first and second washer portions with the first and second apertures and one of the spaced plate apertures aligned to provide for the insertion of the threaded fastener therethrough, with said second washer portion located between the head of the fastener and the first washer portion, and said surfaces have cooperating projections and recesses that inhibit relative movement between the first and second washer portions when the threaded fastener is tensioned urging the surface of said second washer portion against the surface of said first portion securing the first concrete element to the second concrete element.

2. The combination of claim 1, wherein the aperture of said first washer portion has a longitudinal axis with said aperture of said first washer portion being elongated in direction of said longitudinal axis.

3. The combination of claim 1 wherein said projections are ridges and said recesses are slots.

4. The combination of claim 3, wherein the first washer portion surface and the second washer portion surface have ridges and slots.

5. The combination of claim 1 wherein said first portion includes projections to engage an article to be engaged by the threaded fastener.

6. The combination of claim 1 wherein said coupling plate has an aperture to receive at least part of said first washer portion, said coupling plate having a thickness, and wherein said assembly further includes a support plate located in the aperture of the coupling plate, the support plate having a thickness no greater than the thickness of the coupling plate, with said support plate having an aperture through which the threaded fastener is to pass.

7. The combination of claim 6, wherein the aperture of said support plate is the same configuration as the aperture of said first washer portion.

8. The combination of claim 6 wherein said one plate aperture provides a cavity and said support plate substantially occupies said cavity.

9. The combination of claim 1 wherein the projections and recesses of the first washer portion surface and the second washer portion surface surround the apertures of the first and second washer portions.

10. The combination of claim 1 wherein the first washer portion surface and the second washer portion surface has the projections and recesses located in two areas, the areas being located on opposite sides of the respective aperture.

11. The combination of claim 1 wherein the first washer portion is generally circular in configuration.

12. The combination of claim 1 wherein each of the first and second concrete elements having a surface, with the concrete surfaces being adjacent.

13. The combination of claim 12 wherein said projections are ridges and said recesses are slots.

14. The combination of claim 13 wherein the first washer portion surface and the second washer portion surface have ridges and slots.

15. The combination of claim 14 wherein said first washer portion includes projections to engage an article to be engaged by the threaded fastener.

16. The combination of claim 15 wherein said coupling plate has an aperture to receive at least part of said first washer portion, said coupling plate having a thickness, and wherein said assembly further includes a support plate located in the aperture of the coupling plate, the support plate having a thickness no greater than the thickness of the coupling plate, with said support plate having an aperture through which the threaded fastener is to pass, and said one plate aperture is the same configuration as the aperture of said first washer.

17. The combination of 16 wherein said one plate aperture provides a cavity said support plate substantially occupies said cavity, and the projections and recesses of said surfaces surround the apertures of the first and second washer portions.

18. The combination of claim 17 wherein each surface has the projections and ridges located in two areas, the areas being located on opposite sides of the respective aperture, and the first washer portion is generally circular in configuration.

* * * * *